United States Patent

[11] 3,589,397

[72] Inventor William Wagner
5333 Collins Ave., Miami Beach, Fla. 33839
[21] Appl. No. 3,972
[22] Filed Jan. 19, 1970
[45] Patented June 29, 1971

[54] ANTIREFILL VALVE
14 Claims, 9 Drawing Figs.

[52] U.S. Cl. .................................. 137/614.2, 137/523, 137/384.2, 220/86
[51] Int. Cl. ........................................ F16k 35/00
[50] Field of Search .......................... 137/614.2, 523, 383, 384.2, 384, 385; 141/18, 21; 222/3; 220/86; 251/83

[56] References Cited
UNITED STATES PATENTS
2,077,210 4/1937 Brushe .......................... 220/86

Primary Examiner—Laverne D. Geiger
Assistant Examiner—William H. Wright
Attorney—John Cyril Malloy ABSTRACT: A valve for a pressure vessel to prevent refilling of the vessel. The valve includes a body having a flow through passageway between a first and a second port and a valve component assembly having a primary seat-engaging surface to engage a primary seat in the passageway between the ports. Movement of the assembly to control flow through the valve is by manipulation of an operator. The movement is limited to a predetermined length of displacement of the primary seat-engaging surface from the primary seat. An antirefill sealing member is extendibly connected to the inner end of the valve component assembly and is sized for sealing engagement with a second seat in the passageway. The antirefill sealing member is normally seated when the passageway is closed by the primary seat-engaging member, but, when the operator has been manipulated so as to move it off the primary seat to open the passageway, the antirefill sealing member is buoyed by pressure in the vessel into an open position so that it does not engage the second seat and the valve is open; however, when there is no longer sufficient pressure in the vessel to buoy or float it off of the second seat, if efforts are made to refill the vessel, it remains closed blocking the passageway rendering a pressure vessel to which it is secured a single use vessel.

INVENTOR,
WILLIAM WAGNER

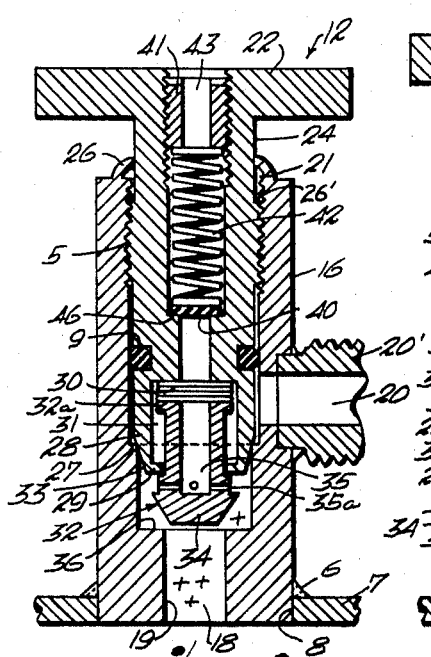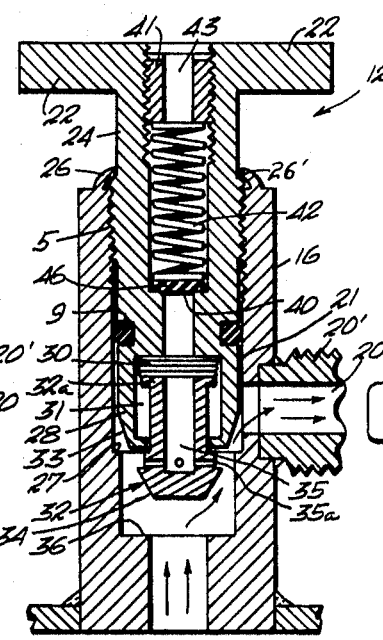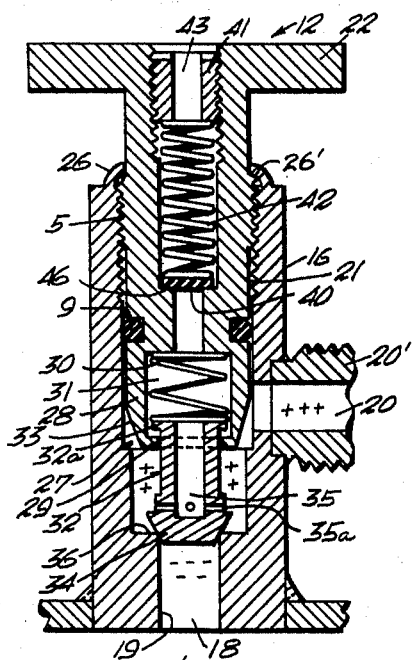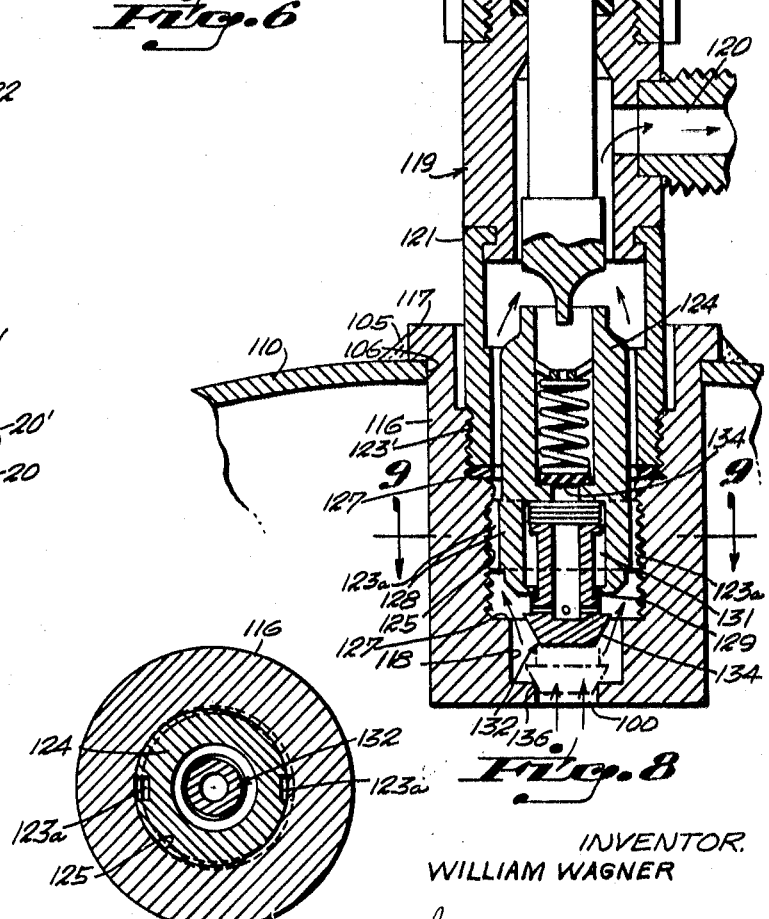

ANTIREFILL VALVE

BACKGROUND OF THE INVENTION

This application is an improvement over the William Wagner U.S. application Ser. No. 829,927, now U.S. Pat. No. 3,552,432 filed June 3, 1969.

The present invention relates to an improved antirefill valve or a single use valve for pressure systems, and, more particularly, to a bottle gas container arrangement to limit reuse of it.

DESCRIPTION OF THE PRIOR ART

For use in many homes and business establishments, fluids under pressure are regularly delivered in vessels. Before delivery, the vessel is filled with fluid under pressure by the supplier through a suitable valve means and transported to the site of use where it is coupled or connected into the user's pressure system which is connected to an appliance. When the fluid supply is low, that is, when the pressure vessel is substantially empty, the canister is replaced. Often the used vessel is taken back and some suppliers refill the vessels, which gives rise to a problem now to be discussed.

Continual reuse of the vessel or canister is highly objectionable for many reasons which relate to safety. Although a canister can withstand several subsequent uses, it ultimately reaches a weakened condition because of the variations in pressure to which it is subjected and because of many other factors, not the least of which is rust and damage in transport. Often such vessels under pressure cause damage or injury, and, in general, reuse of them is objectionable, In the past, valves have been developed for pressure systems, and although the valve art is crowded and highly developed, the prior art has not provided a satisfactory single use valve for charging fluid under pressure to a canister.

SUMMARY OF THE INVENTION

The valve of this invention is adapted to regulate the discharge of the pressurized fluid and to prohibit refilling of the vessel. It includes (a) a primary seat surface and a seat-engaging means effective when unseated to permit discharge of the pressurized fluid from the vessel, and (b) and antirefill means which includes a second seat and a valve component arranged so that, while the primary seat and member are opened, it is buoyed into an open position by fluid pressure in the vessel, so long as it is pressurized, but closing the valve and preventing a recharging of fluid into the vessel when the vessel is no longer under pressure.

Thus, the antirefill valve having the dual seats and the primary seat-engaging component and extendible secondary or antirefill seat-engaging component limits the reuse of pressurized tanks to which mounted. Often it is important that pressurized tanks be filled only under carefully controlled conditions at a charging station before distribution to various places for use. However, because of attractive economies of refilling containers at points of use or otherwise repressurizing them, they are often refilled with materials which are not pure. Also, repressurization often takes place without adequate prior inspection of the vessel, so that use of weakened vessels frequently occurs which can result in injurious explosions. Thus, there has been a need for an improved valve which prohibits refilling of pressure vessels.

Generally speaking, the present invention contemplates an improved antirefill valve for use with a pressure vessel. It includes a housing or valve body characterized by dual seats, and valve components which are interconnected and movable in a central bore. One of the valve components comprises a primary seat-engaging surface to engage one of the seats and the other comprises a floating or buoyed antirefill valve component also having a seat-engaging surface to engage the other seat when it is not buoyed up or floating. When the vessel to which the valve is mounted is under internal pressure, and the valve is opened by an operator, the antirefill valve component is buoyed or floated by the pressure within the vessel to an open position, i.e., off the secondary seat, so that manipulation of the valve component having the primary seat-engaging surface to move it relative to the primary seat controls the flow through the valve; however, once the vessel is no longer under pressure, if efforts are made to recharge the pressure vessel, the imbalance of pressure will cause the antirefill valve component to cease floating and move into closing relation of the second seat. This is so that the valve is automatically closed and cannot be recharged when efforts are made to use it again. Blocking means are provided so that the assembly of valve components cannot be moved beyond the fall, or distance of extendability, of the antirefill valve component without destruction of the entire valve assembly. The purpose of this is so that on reduction of pressure below that which is sufficient to float the antirefill seat-engaging member off the second seat, the antirefill valve component will fall or extend to close the secondary seat, thus closing the valve and preventing recharge of the vessel, even though the valve operator is in the full open position.

BRIEF DESCRIPTION OF THE DRAWING

FIG. 5 is a cross-sectional view of the valve of the pressure vessel after it has been filled with a gas;

FIG. 6 is a cross-sectional view of the valve of the pressure vessel when attached for use to a pressure system;

FIG. 7 is a cross-sectional view of the valve of the pressure vessel showing the valve position when the vessel is empty, indicating the operation on a refill effort.

FIG. 8 is a cross-sectional view of a modified version of the valve depicted in FIGS. 3 to 7; and FIG. 9 is a sectional view along the lines 9–9 of FIG. 8.

DESCRIPTION OF PREFERRED EMBODIMENT OF THE INVENTION

A vessel 10 to be pressurized and connected to a pressure system, not shown, is provided with an antirefill valve 12 for single use filling of the vessel and selectively discharging fluid from the vessel. The valve is intended to be permanently secured to the vessel as by welding; and, preferably, it is protectively shielded between the pair of support handles or guides 14, seen in FIG. 1, which may also serve as lifting handles. Alternatively, the valve may be recessed, as will be described in connection with the embodiment of FIG. 8, so as not to project substantially above the surface of the vessel or canister in transport in an exposed condition and be subjected to being accidentally broken from sealing engagement with the vessel.

Figure 1:
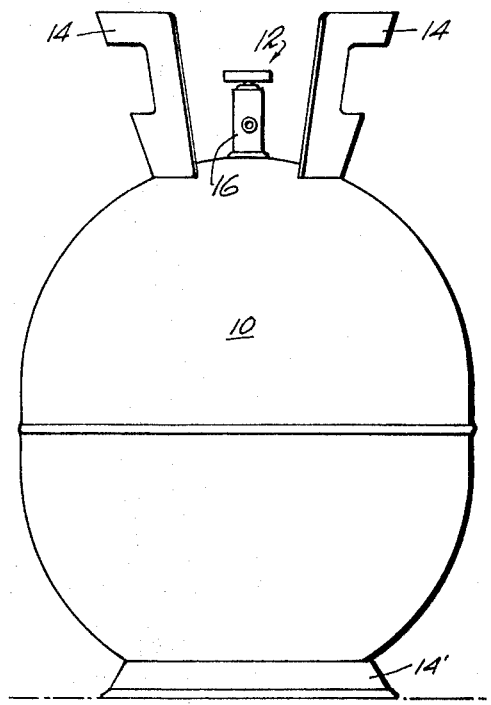
FIG. 1 is a front view of a pressure vessel with a gas under pressure therein and showing the valve of the present invention mounted thereon between a pair of supporting handles or guards, the valve being on top of the vessel.
Figure 2:
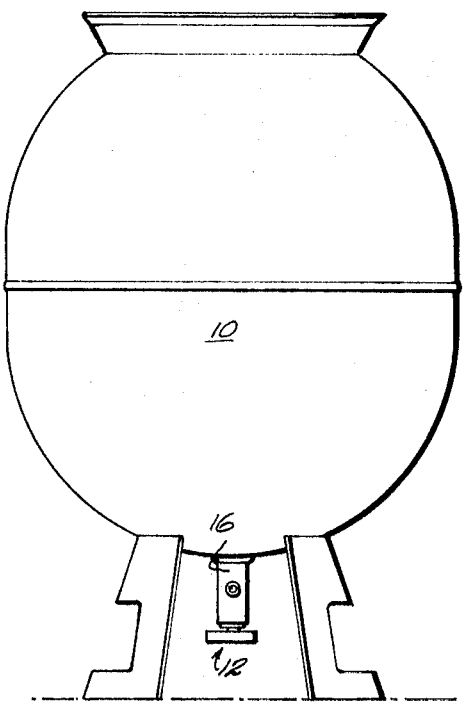
FIG. 2 is a front view of a pressure vessel with a liquid under pressure therein similar to FIG. 1 wherein the vessel is supported by the supporting handles, the valve being at the bottom of the container.
Figure 3:
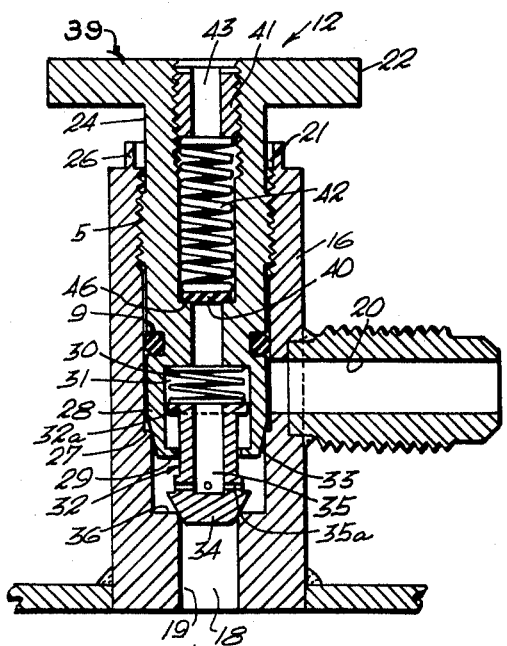
FIG. 3 is a cross-sectional view of the valve of the present invention at a time prior to charging fluid into the vessel through the valve.

With reference first to the embodiment of FIGS. 1 through 7 and initially to FIG. 3 for instance, it is seen that the valve 12 is provided with a valve body or housing 16 having a through passageway which in the preferred embodiment comprises an axial or central through bore 18 for communicating with the interior of the vessel 10 when mounted thereto and also having a side opening first port means 20 communicating with the aforesaid passageway 18 running axially through the body. For purposes of discussion, one end of said bore 18 may be considered as comprising a second port means 19 spaced from the first port means 20. The other or upper end 21 of the bore 18, remote from the port means 19 and 20, is closed by a valve component assembly, generally indicated by the numeral 39 which includes an operator means 22 or control handle having a stem 24 which is preferably hollow and is in threaded engagement within the upper portion of the bore 18.

In the preferred embodiment, the open upper end 21 of the bore is bounded by limit means 26 to limit movement of displacement of the valve component assembly in the passageway, the limit means illustrated comprising a formable flange 26, adapted to be bent into blocking relation of axial movement of withdrawal of the valve component assembly 39 from the bore 18 of the housing 16.

The inner portion of the stem 24 is provided with it a primary seat-engaging means which is at all times in the passageway 18, and in the preferred embodiment, it comprises a hollow annular extension 28 of frustoconical configuration to engage a seat to be described. It terminates at an inwardly turned lip 29, the hollow interior comprising a chamber 31 with an axially facing mouth bounded by the lip 29.

Within the chamber 31, an extensible sealing member valve component 32 is captivated, said sealing member including a tubular portion extending through the lip 29, the proximal end terminating at a flared rim 32a, or other suitable means, to captivate it in the chamber 31, the lip 29 and flared rim 32a of the illustrated embodiment comprising means extensibly intermating the component 32 to the valve component assembly 39. It is seen that the walls circumposed about the chamber 31 of the annular tubular extension 28 act as guides to maintain axial alignment of the sealing member 32 on axial movement of it and thus may be considered to be intercooperating means between the sealing member and the valve component assembly to guide and constrain movement of the component or sealing member between an unseated position and a position sealing the passageway between the port means 19 and 20, as will now be explained.

Referring to FIG. 3 through 7, all of which illustrate the valve of the first preferred embodiment with the valve assembly 39 in various positions corresponding to the function of the valve being illustrated in each of the several views, it is seen that between the port means 19 and 20, dual valve seat means are provided. First, there dual valve seat means include a primary seat surface 27. This seat surface in the preferred embodiment is defined by an annular shoulder in the bore 1 formed by a counterbore. Second, these dual valve seat means include an antirefill seat surface 36. This is also formed at a shoulder in the bore 18 by a counterbore of the bore 18.

As referred to above, the frustoconical surface of the hollow annular extension 28 constitutes a primary seat-engaging means, designated by the numeral 33. At the end of the valve component or sealing member 32 an antirefill seal engaging means is provided which, in the preferred embodiment, constitutes a frustoconical headed end portion of the free terminal end 34 of the extensible or floating sealing member 32.

In a manner conventional in the valve art, suitable sealing means 9 are provided between the valve stem and the bore walls, in this embodiment comprising an annular groove in the circumference of the stem 24 at a point which is normally disposed intermediate the formable flange 26 and the side opening port means 20 and an O-ring captivated within the groove.

Safety valve means are preferably provided for the antirefill valve and will be described following the description of the operation of the first embodiment of the invention, which follows in the next paragraph.

OPERATION OF THE FIRST EMBODIMENT OF THE INVENTION

Figure 4:
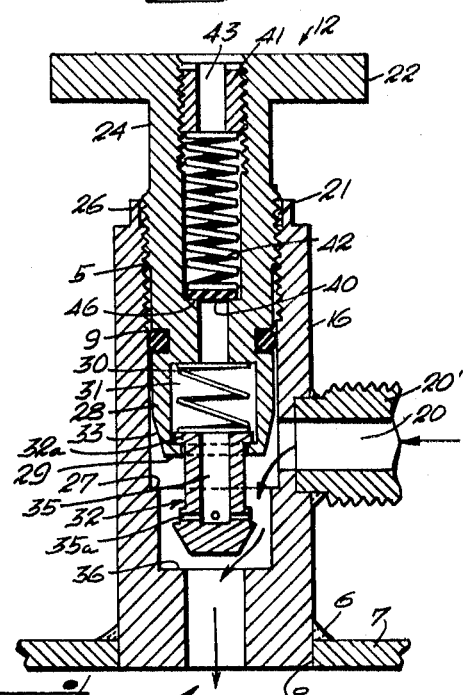
FIG. 4 is a cross-sectional view of the valve of the present invention at the time when the pressure vessel is being filled.

The valve body, which is preferably of steel and shown in FIG. 3, is first secured to an opening 8 in the wall 7 of the tank, preferably in a permanent condition, as by welding 6, as indicated in FIG. 4, or affixed by brazing as in the case of a brass body. In order to fill the vessel 10 having the valve so mounted, the valve control handle 22 of the operator means is withdrawn by retrograde movement to a position generally indicated in FIG. 4, as opposed to the position shown in FIG. 3. The distance of retrograde movement is sufficient to withdraw and to unseat the primary seat-engaging means, that is, the frustoconical surface 33, from the primary seat surface or shoulder 27 and, also, the antirefill seat-engaging means, that is, the distal end of the sealing member 32 from the antirefill seat surface or shoulder 36, the latter unseating constituting opening of the antirefill means.

In other words, and worthy of note at this point is that the retrograde movement of displacement axially of the entire valve component assembly is such that this axial displacement with respect to the housing 16 and both seats of the dual seat means is greater than the extent of permissible extension of the means extensibly intermating the sealing member component and the assembly, so that, as a result, the seat-engaging surface 33 of the sealing member is displaced a distance greater than the full extension permitted and the secondary antirefill seat surface 36 is physically out of reach until the entire valve component assembly is again advanced toward the seats to within the range of extensible movement.

In the preferred embodiment, the limit means 26 are provided so that this range can never again be exceeded after the vessel has been pressurized. The flange lip 26 which compresses the limit means is arranged to limited displacement of the stem as shown in FIG. 5 through 7 and as will be explained. At any rate, with the primary and antirefill seat-engaging means both in the unseated condition shown in FIG. 4, the vessel may be filled by feeding pressurized fluid through the port means 20 which is preferably provided with the nipple means 20' as indicated in FIG. 4.

When the vessel is filled (refer now to FIG. 5 where this condition is shown), the operator means is manipulated by turning the handle 22 which in turn threadably advances the stem depthwise into the passageway or through bore 18, the thread means being indicated by the numeral 5 until the primary seat-engaging means 33 and primary seat surface 27 are in sealing engagement with one another as shown in FIG. 5.

When in this condition the limit means are rendered effective to permit limited withdrawal only of the stem, i.e., to limit axial displacement of withdrawal of the valve component assembly relative to the valve body. As shown in FIG. 5, this is accomplished by deforming the formable lip or flange 26 into blocking engagement of a stop means or collar 26' comprising an enlargement on the stem 24. This may also be effected by inserting a lock ring in the housing circumposed about the operator shaft, not shown in the drawings. These means are effective to limit retrograde movement of the handle and stem 24 with respect to the housing; and for convenience, this enlargement may also constitute the outer diameter of the threaded portion 5 of the stem. In this condition, by reason of the pressure within the vessel indicated by the plus signs in FIG. 5, the sealing member is urged away from the antirefill seat surface, that is, in the embodiment shown, into telescoped relation into the chamber 31, but, and importantly, the primary seal is maintained as indicated.

However, the operator means 22 may be manipulated to withdraw the valve component assembly within the limited range of movement to open the valve and permit flow of the pressurized fluid through the port means as indicated by the arrowed lines in FIG. 6. The displacement of the primary seat-engaging means with respect to the primary seat surface is limited to a predetermined length of movement of displacement by the limit means 26; that is, it may be withdrawn only until the stop means 26' of the stem enlargement 24 engages the deformed flange 26 which defines and constitutes the limit of retrograde movement.

Thus, when the vessel is attached to some utilitarian device and it is desired to supply fluid under pressure to the pressure system of that device, the handle is withdrawn as indicated in FIG. 6. It is seen that in this condition the pressure of the gas within the chamber of the vessel acts against the head 34 of the sealing member maintaining it in a telescoped or floated condition.

On the other hand, when there is no longer a sufficient volume of fluid in the vessel, the pressure will, of course, be diminished and there will no longer be a sufficient buoyant force to maintain the antirefill seat-engaging means of the valve component or sealing member 32 in the floated condition shown in FIG. 6, therefore, the antirefill sealing means will then move into engagement with the antirefill seat surface 36 even when the valve is open as shown in FIG. 7. Thus, when the valve is mounted on a vessel, as shown in FIG. 1, which is in the orientation for holding a gas under pressure, if an attempt is made to refill it after the original charge of gas has been used, the sealing member 32 will, even when the valve is fully open, be closed positively in response to any increase of pressure on the supply system side, that is, as indicated by the plus signs in FIG. 7, so that an increase in pressure through the nipple means 20', the port means 20 and in the passageway 18, will urge the antirefill means into the sealing relation shown in FIG. 7.

Briefly, with respect to fig. 2, it is seen that the vessel may be inverted so that the guides 14 may be employed, instead of the circumferential foot 14', to support the vessel 10. In this attitude is adapted to supply pressurized liquid to a pressure system. Especially when so employed in the preferred embodiment, a spring 30 is employed in the chamber 31 to normally urge the sealing member 32 toward the position of sealing engagement of the antirefill seat means and seat surface shown in FIG. 7; however, the bias of the spring is relatively weak so that the pressure within the vessel is sufficient to overcome the weak bias of the spring and to maintain the antirefill means in an unseated condition until substantially all of the volume of the pressurized fluid in the vessel has been discharged.

It is seen that at all times material to the operation of this device there is sufficient pressure in the vessel 10 to hydraulically maintain the antirefill sealing means in a floating open condition with respect to the antirefill seat, thus permitting overriding control by the operator means 22 controlling the primary seal between the primary seal and seal-engaging means. The operator is selectively employed to control discharge of the vessel contents through the port means and passageway as long as the primary seat means is unseated whereby control and regulation of the discharge of the pressurized contents may be effected by the manipulation of the operator means or handle 22. Importantly, when the vessel has been filled and the limit means 26 rendered effective, there is no way for recharging the vessel with fluid under pressure, without first destroying the valve, because, as explained, the valve component assembly is constrained by the limit means to a predetermined displacement. It is thus seen that this valve and vessel in combination comprise a single use valved pressure container.

DESCRIPTION OF SAFETY VALVE

In a preferred embodiment, a safety valve is included within the valve component assembly. The safety valve means has a gas escape path extending through the interior of the valve component of the antirefill seat-engaging means, or sealing member 34, this portion of the path being designated by the numeral 35, the chamber 31, and a recess 43 of the stem 24 and a spring-biased safety sealing member 40 spanning and sealing this path and normally dwelling upon a seat 46 defined in the stem 24 by a counterbore in the through recess 43. The sealing member 40 is biased by a secondary spring 42 captivated in the upper end of the hollow stem 24 by a plug 41, the spring urging the sealing member 40 against the seat 46. Thus, on expansion of gas causing dangerously high pressure within the vessel of sufficient intensity to exert a pressure on the sealing member 40 communicated through the aforesaid path, to overcome the bias of the spring 42, the sealing member 40 is lifted off the seat 46 and thus opens the escape path to atmosphere through the hollow or recess 43 of the stem.

OPERATION OF THE SAFETY VALVE

When the primary seat-engaging means 33 is in engagement with the primary seat surface or shoulder 27 and there is a pressure buildup in the vessel to an unsafe condition, the sealing member of the antirefill means will be buoyed into the unseated condition indicated in FIG. 5, in which condition by reason of the gas escape apertures 35a permits a communication of this pressure buildup through the safety path described above so that the critical pressure is exerted upon the sealing member 40 to be released when sufficient to overcome the predetermined bias of the safety spring 42 captivated by the plug 41 in the threaded stem recess 43.

ALTERNATIVE PREFERRED EMBODIMENT

Reference is now made to FIG. 8 and 9. In certain cases, particularly for large pressure vessels, it is desirable that the valve be protectively recessed sufficiently so that it does not project substantially above the surface of the container. This is particularly so for large pressure vessels to protect the valve during shipment. An embodiment of the valve which is suitable for such a recessed arrangement with a pressure vessel is shown in FIG. 8. The valve which is generally designated by the numeral 112 includes a housing 116 with a mounting flange 117 from whence the valve body depends or extends into the vessel interior when the flange is secured to the margin of an opening 106 as by the welding 105. The housing is provided with a through passageway comprising a central bore 118 communicating at the inner end thereof through a port means 100 with the interior of the vessel 110. The housing is provided with an outer housing extension 119 threadably connected by a connecting cylinder 121. The outer housing extension includes a side port means 120 communicating with the central passageway or bore 118 and it is adapted to be threadably removed for shipment. A valve control handle 122 having an engaging arm or stem 123 is connected through the upper end 119' of the housing extension. The inner end of the engaging are 123 engages a hollow stem 124 of an operator means located substantially within the housing 116 and extending into the connecting cylinder 121. The hollow stem 124 is provided with a threaded inner end portion 128 which engages mating internal threads 125 in the passageway of the housing 116, which is not at first apparent from the drawings until the reader realizes that there are axial slots 123a along the end portion. Also, the connecting cylinder 121 is threadably engaged in the housing 116 by an additional set of threads 123' located outwardly of the threads 125 used for threadably connecting the hollow stem 124 within the passageway. Threads 123' are of a wider diameter than threads 125. When the connecting cylinder 121 is threaded onto the housing 116, a washer 127 is placed intermediate the leading edge and the shoulder of the housing between the threads 123' and the threads 125, and this washer is adapted to forcibly deform the shoulder and the threads at the shoulder so that movement of the hollow stem 124 is limited by this means and fixed in the position shown in FIG. 8. Neither the deformation of the threads nor the threads themselves is sufficient to block the flow path and to prevent the passage of gas, however, which is intended to pass as will be explained. To encourage the passage of gas, as shown in FIG. 9, the threads do not completely encircle the stem but include longitudinally extending gas passageways 123a circumposed thereabout. Within the stem 124 a chamber 131 is defined having retaining lips 129 to captivate the inner end of tubular extension 132. This extension has an outwardly flared proximal or inner rim to engage the lip and effectively captivate the tubular extension 132 for telescopic extension relative thereto. Within the housing 116 a primary seat surface 127 is provided by a shoulder resulting from a counterbore to serve as a primary valve seat for the end seat surface of the inner extension 128 of the stem 124 which is configured to mate with the primary seat surface 127 and constitutes a primary seat-engaging means. The tubular extension 132 comprising a sealing member is configured at its outer free end so as to define an antirefill seat-engaging surface or means to engage an antirefill seat surface in the bore 118 formed by a should at the intersection of a counterbore and a through bore and designated by the numeral 136. The upper portion of the hollow stem 124 is also provided with a safety valve means similar to that previously described with respect to the first embodiment so that dangerous expansion of gas may bypass the antirefill sealing member 134 through a gas escape path into the upper portion of the hollow stem 124 and escape to atmosphere through the pressure system which includes suitable vent means, or, alternatively, suitable safety valve means may be located in the upper portion of the structure shown in FIG. 8, such as in a hollow within the arm 123.

OPERATION OF THE SECOND EMBODIMENT OF THE INVENTION

The valve housing is suitably mounted to the vessel, and the valve control handle is used so that the engaging arm 123 engages the stem 124 in a screwdriver type connection to withdraw or to open the primary and antirefill sealing means unseating them as in the first embodiment. The vessel is then adapted to be filled through the port 120. After the vessel has been filled the handle 122 of the control valve is advanced until the primary sealing member is in contact with the primary seat surface 127. The connecting cylinder 119 is then threadably advanced forcibly to cause the washer 127 to deform the threads at the shoulder at the intersection of the threads 123' and 125 to deform them at this juncture to define limit means to lock the stem 124 within the space constraining the same and limiting it to a predetermined axial displacement of the primary seat-engaging means relative to the primary seat surface. The connecting cylinder 121 may then be removed and the vessel shipped without any substantially protruding valve structure. At the destination a similar connecting cylinder 121 and housing extension 119 may be employed as a valve control means to operate the operator means of the valve with the engaging arm 123 being effective to lift the primary sealing means from the primary seat surface. As in the first embodiment, the gas pressure prevents the antirefill seat-engaging means from seating which floats in the position shown in FIG. 8 by the buoyant force of the pressurized gas so long as pressure remains within the vessel, but seats if efforts are made to recharge the cylinder through the port means, thereby rendering the same an antirefill single use valve and vessel combination.

What I claim is;

1. A valve for use with a pressure vessel comprising in combination:
  a. a valve housing having a central bore therethrough, said housing having a port intermediate the central bore, and first and second valve seats in the central bore in spaced relation with respect to one another and each being between the port and one end of the bore,
  b. a stem component assembly extending into the other end of the bore with one end at all times in the housing, said assembly including (1) a first sealing means in the bore sized to sealingly engage said first valve seat and (2) an extendible portion in the bore including a second sealing means sized to sealingly engage said second seat,
  c. first mutually intercooperating means interconnecting said housing and said assembly and effective for advancement and withdrawal of the first sealing means with respect to the first valve seat to seat and unseat respectively said first sealing means and said first valve seat to control flow through the central bore between said one end of the bore and the port,
  d. second mutually intercooperating means interconnecting said extendible portion and assembly and effective for movement of extension of said second sealing means a first predetermined distance with respect to said first sealing means; and
  e. means on the valve and in the path of movement of said valve component assembly effective to limit withdrawal movement of said first sealing means to a predetermined maximum distance of displacement from said first valve seat which is less than said first predetermined distance;
  f. whereby, when (1) the valve is mounted to a pressure vessel, (2) the pressure vessel has been filled, and (3) the limit means limit movement of withdrawal of the first sealing means, then (1) said first sealing means are adapted to be moved into and out sealing engagement with said first valve seat to control flow of pressurized fluid between the port and said one end of the bore, and (2) said second sealing means are buoyed by the pressure in the vessel out of sealing engagement with said second valve seat so long as the pressure in the vessel is substantially greater than at the port and, if the pressure at the port exceeds that of the pressure in the vessel, the second sealing means engages said second valve seat and closing the valve so that the pressure vessel cannot be recharged.

2. The valve as set forth in claim 1 wherein the other end of said stem component assembly extends out of the other end of the bore and operator means are provided to manipulate the assembly exteriorly of the housing.

3. The valve as set forth in claim 1 wherein said second mutually intercooperating means comprises a telescopic connection of said extendible portion and said one end of said valve component assembly.

4. The valve as set forth in claim 3 wherein biasing means are provided to normally urge the extendible portion into an extended position.

5. The valve as set forth in claim 1 wherein said first mutually intercooperating means includes sealing means intermediate the stem component assembly and valve housing.

6. The valve as set forth in claim 4 wherein a flow through path is provided in the stem component assembly between the outer end of the assembly and said one end and a spring biased member is arranged in closing relation of said path and comprises a safety valve to permit escape of fluid through the path when the bias of the spring is overcome.

7. The valve as set forth in claim 1 wherein said means on the valve and in the path of movement of said valve component assembly comprises a formable flange on the housing adapted to be moved into the path of movement of the stem component assembly and stop means on the valve component assembly to engage the formable flange when it is in the path of movement to limit movement of withdrawal of the first sealing means from the first valve seat.

8. The valve as set forth in claim 1 wherein a vessel is provided in combination with said valve, said vessel having a single opening and said valve being secured in said opening in fluidtight relation.

9. The combination as set forth in claim 8 wherein shield means are provided about said valve and said valve extends out of the surface of said vessel within said shield means.

10. The combination as set forth in claim 8 wherein the valve is recessed and lies substantially within the vessel.

11. The combination as set forth in claim 10 wherein an operator means is provided to engage said assembly and to manipulate the first sealing means relative to said first valve seat to control fluid flow through said valve.

12. An improved valve for closing a single use pressurized vessel which is adapted to be connected into fluid connection with a pressure system, which includes the combination of
  A. a valve body having a flow through passageway with a first and a second port means adapted respectively to open into the vessel and to open into the pressure system, said port means being in spaced relation;
  B. a primary seat surface in the passageway intermediate the port means;
  C. a valve component assembly including,
    1. a primary seat engaging means at all times in the passageway, and
    2. operator means effective to displace said primary seat-engaging means into and out of sealing relation with the primary seat surface to regulate fluid flow between the vessel and the system;

D. limit means to limit displacement of the primary seat-engaging means with respect to the primary seat surface to a predetermined length of movement; and E. antirefill means including a sealing member,
- 1a. responsive to a greater pressure in the system than in the vessel to seal the passageway so that the vessel cannot be recharged,
- 1b. said sealing member normally closing said passageway when movement of said seat-engaging means is constrained to limited displacement by said limit means; and
- 2. said sealing member responsive to pressure in the vessel greater than the pressure in the system to open to permit fluid flow between said port means when the primary seat means is not in sealing relation with said primary seat surface, F. in which the improvement resides in:

G. said antirefill means comprising:
1. an antirefill seat surface in the passageway intermediate the ports and separate and spaced from said primary seat surface;
2. said sealing member comprises
    a. a valve component having an antirefill seat engaging means companionately sized for mating relation with said antirefill seat surface;
    b. means intermating said valve component and said assembly;
    c. mutually intercooperating means on said sealing member and on the assembly to permit a range of movement of the antirefill seat-engaging means of said component a distance at least as great as said predetermined length of movement so that it is at all times adapted to sealingly engage the antirefill seat surface; and
    d. said sealing member being responsive (1) to a greater pressure in the vessel than in the supply system to be buoyed into an open position and (2) to a greater pressure in the supply system than in the vessel to seal the passageway against an inflow of fluid to recharge the vessel.

13. The valve as set forth in claim 12 in combination with a pressurized vessel having an opening and means to secure said valve in fluid tight relation in said opening.

14. The valve as set forth in claim 12 wherein the means intermating and said mutually intercooperating means comprise means telescopically connecting said sealing member and the assembly and including guide means to constrain the same to linear movement of displacement relative to said assembly.